US010166956B2

(12) United States Patent
Schick et al.

(10) Patent No.: US 10,166,956 B2
(45) Date of Patent: Jan. 1, 2019

(54) DUAL LINE HYDRAULIC TRAILER BRAKE CONTROL CIRCUIT AND METHOD OF CONTROL THEREOF

(71) Applicant: Deere & Company, Moline, IL (US)

(72) Inventors: Troy E. Schick, Cedar Falls, IA (US); Ryan A. Pence, Cedar Falls, IA (US); Brandon J. McMillen, Cedar Falls, IA (US); Aaron M. Quinn, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/222,088

(22) Filed: Jul. 28, 2016

(65) Prior Publication Data

US 2018/0029571 A1 Feb. 1, 2018

(51) Int. Cl.
*B60T 8/17* (2006.01)
*B60T 15/02* (2006.01)
(Continued)

(52) U.S. Cl.
CPC ............ *B60T 8/1708* (2013.01); *B60T 13/12* (2013.01); *B60T 15/027* (2013.01);
(Continued)

(58) Field of Classification Search
CPC ........ B60T 7/20; B60T 8/1708; B60T 8/1887; B60T 8/323; B60T 11/108; B60T 13/265;
(Continued)

(56) References Cited

U.S. PATENT DOCUMENTS 8,974,011 B2 3/2015 Schick et al.
2013/0134770 A1* 5/2013 Komoriya ............ B60T 13/683 303/20

(Continued)

FOREIGN PATENT DOCUMENTS

| | | | |
|---|---|---|---|
| DE | 3714383 | A1 | 11/1988 |
| GB | 2492124 | B * | 8/2017 |
| WO | 2007/135160 | A1 | 11/2007 |

OTHER PUBLICATIONS

European Patent Office. Extended European Search Report issued in Application No. 17178840.9. dated Dec. 7, 2017. 9 pages.

*Primary Examiner* — Thomas J Williams
*Assistant Examiner* — Mariano Sy
(74) *Attorney, Agent, or Firm* — Taft Stettinius & Hollister LLP; Stephen F. Rost

(57) ABSTRACT

A method of detecting a leak in a hydraulic trailer brake circuit of a trailer includes providing a controller, a base valve, a first sensor, a second sensor, a control valve having a solenoid, a reduction valve, a hydraulic fluid supply, a first brake output, and a second brake output. The method also includes supplying a first pressure to an inlet of the base valve and outputting a second pressure from an outlet of the base valve to the first brake output. The first pressure is detected by the first sensor and the second pressure is detected by the second sensor, and the detected first and second pressures are communicated to the controller. The difference between the first and second pressures are compared to a threshold, and a leak is detected in the hydraulic trailer brake circuit if the difference satisfies the threshold.

19 Claims, 5 Drawing Sheets

(51) Int. Cl.
*B60T 13/12* (2006.01)
*B60T 17/22* (2006.01)

(52) U.S. Cl.
CPC .......... *B60T 15/028* (2013.01); *B60T 17/221* (2013.01); *B60T 17/226* (2013.01); *B60T 2270/403* (2013.01)

(58) Field of Classification Search
CPC ...... B60T 13/403; B60T 13/12; B60T 15/027; B60T 15/041; B60T 15/181; B60T 15/182; B60T 15/20; B60T 15/203; B60T 15/223; B60T 15/226; B60T 17/226; B60T 17/223
See application file for complete search history.

(56) References Cited

U.S. PATENT DOCUMENTS

2015/0344011 A1* 12/2015 Casali ....................... B60T 7/04
303/7
2017/0197603 A1* 7/2017 Minato ................. B60T 15/041

* cited by examiner

DUAL LINE HYDRAULIC TRAILER BRAKE CONTROL CIRCUIT AND METHOD OF CONTROL THEREOF

FIELD OF THE DISCLOSURE

The present disclosure relates to a fluid control circuit, and in particular, to a dual line hydraulic trailer brake circuit.

BACKGROUND OF THE DISCLOSURE

Tractor trailer combinations generally require a braking system on the trailer that is engaged when a braking system of the tractor is selectively engaged. Often the braking system of the trailer is coupled to the braking system of the tractor to allow the tractor to simultaneously apply the braking system of the tractor and the trailer. Conventional trailer brake circuits include a single line for pressurizing the brakes.

SUMMARY

In one embodiment of the present disclosure, a method of detecting a leak in a hydraulic trailer brake circuit of a trailer includes providing a controller, a base valve, a first sensor, a second sensor, a control valve having a solenoid, a reduction valve, a hydraulic fluid supply, a first brake output, and a second brake output; supplying a first pressure to an inlet of the base valve; outputting a second pressure from an outlet of the base valve to the first brake output; detecting the first pressure with the first sensor and the second pressure with the second sensor; communicating the detected first pressure and the second pressure to the controller; comparing a difference between first pressure and the second pressure to a threshold; and detecting a leak in the air trailer brake circuit if the difference satisfies the threshold.

In a first example of this embodiment, the method may include de-energizing the solenoid of the control valve via the controller if the difference satisfies the threshold. In a second example, the method may include actuating the control valve to a closed position if the difference satisfies the threshold. In a third example, the method may include supplying an amount of pressurized fluid from the hydraulic fluid supply to the control valve. In a fourth example, the method may include reducing the amount of pressurized fluid supplied to the control valve via the reduction valve. In a fifth example, the method may include providing the base valve with a fixed gain; and determining the difference by multiplying the first pressure by the fixed gain, and then subtracting the second pressure therefrom.

In a sixth example of this embodiment, the method may include energizing the solenoid if the difference does not satisfy the threshold. In a seventh example, the method may include fluidly coupling the hydraulic fluid supply to the second brake outlet if the solenoid is energized. In an eighth example, the method may include blocking hydraulic fluid from the second brake outlet when the difference satisfies the threshold. In a ninth example, the method may include fluidly coupling a park brake of the trailer to the control valve; and applying the park brake if the difference satisfies the threshold. In another example, the method may include disengaging the park brake of the trailer if the difference does not satisfy the threshold. In a further example, the method may include fluidly coupling the first brake output and the second brake output to the fluid supply in parallel when the difference does not satisfy the threshold.

In another embodiment of the present disclosure, a hydraulic braking system of a trailer includes a pressurized supply of hydraulic fluid; a base valve including an inlet and an outlet; a control valve including a solenoid, an inlet fluidly coupled to the pressurized supply of hydraulic fluid, and an outlet, the control valve operably controlled between an energized state and a de-energized state; a first brake output fluidly coupled to the outlet of the base valve; a second brake output fluidly coupled to the outlet of the control valve; a first sensor and a second sensor fluidly coupled to the base valve, the first sensor configured to detect a first pressure at the inlet of the base valve, and the second sensor configured to detect a second pressure at the outlet of the base valve; wherein, the control valve is operably controlled to its de-energized state when a difference between the first pressure and second pressure satisfies a threshold.

In one example of this embodiment, in the de-energized state the pressurized supply is fluidly coupled to the second brake output, and in the energized state the control valve fluidly de-couples the pressurized supply from the second brake output. In a second example, the system may include a controller disposed in electrical communication with the first and second sensors; and the base valve comprises a fixed gain; wherein, the controller compares the first pressure as a function of the fixed gain to the second pressure to determine the difference and whether to operably control the control valve to its energized state or de-energized state. In a further example, the system may include a reduction valve fluidly coupled between the pressurized supply and the control valve, wherein the reduction valve is configured to reduce an amount of fluid pressure supplied by the pressurized supply to the control valve. In yet a further example, the system may include a park brake hydraulically controlled by the second brake output between a disengaged position and an engaged position, wherein in the de-energized state the park brake is in its disengaged position, and in the energized state the park brake is in its engaged position.

In a further embodiment of the present disclosure, a hydraulic braking system of a trailer towed by a work machine includes a controller; a pressurized supply providing hydraulic fluid; a pilot line providing a pilot pressure; a base valve including a first inlet, a second inlet, and an outlet, where the first inlet is fluidly coupled to the pilot line and the second inlet is fluidly coupled to the pressurized supply; a solenoid control valve disposed in electrical communication with the controller and including an inlet fluidly coupled to the pressurized supply of hydraulic fluid and an outlet, the solenoid control valve operably controlled between an energized state and a de-energized state by the controller; a reduction valve fluidly coupled between the pressurized supply and the solenoid control valve, wherein the reduction valve is configured to reduce an amount of fluid pressure supplied by the pressurized supply to the solenoid control valve; a first control line fluidly coupled to the outlet of the base valve; a second control line fluidly coupled to the outlet of the solenoid control valve; a first sensor and a second sensor fluidly coupled to the base valve, the first sensor configured to detect pilot pressure, and the second sensor configured to detect an output pressure in the first control line; wherein, the solenoid control valve is operably controlled to its energized state when a difference between the pilot pressure and output pressure satisfies a threshold.

In one example of this embodiment, in the energized state the pressurized supply is fluidly coupled to the second control line, and in the de-energized state the solenoid control valve fluidly de-couples the pressurized supply from the second control line. In another example, the system may include a park brake hydraulically controlled by the solenoid control valve between a disengaged position and an engaged position, wherein in the energized state the park brake is in its disengaged position, and in the de-energized state the park brake is in its engaged position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
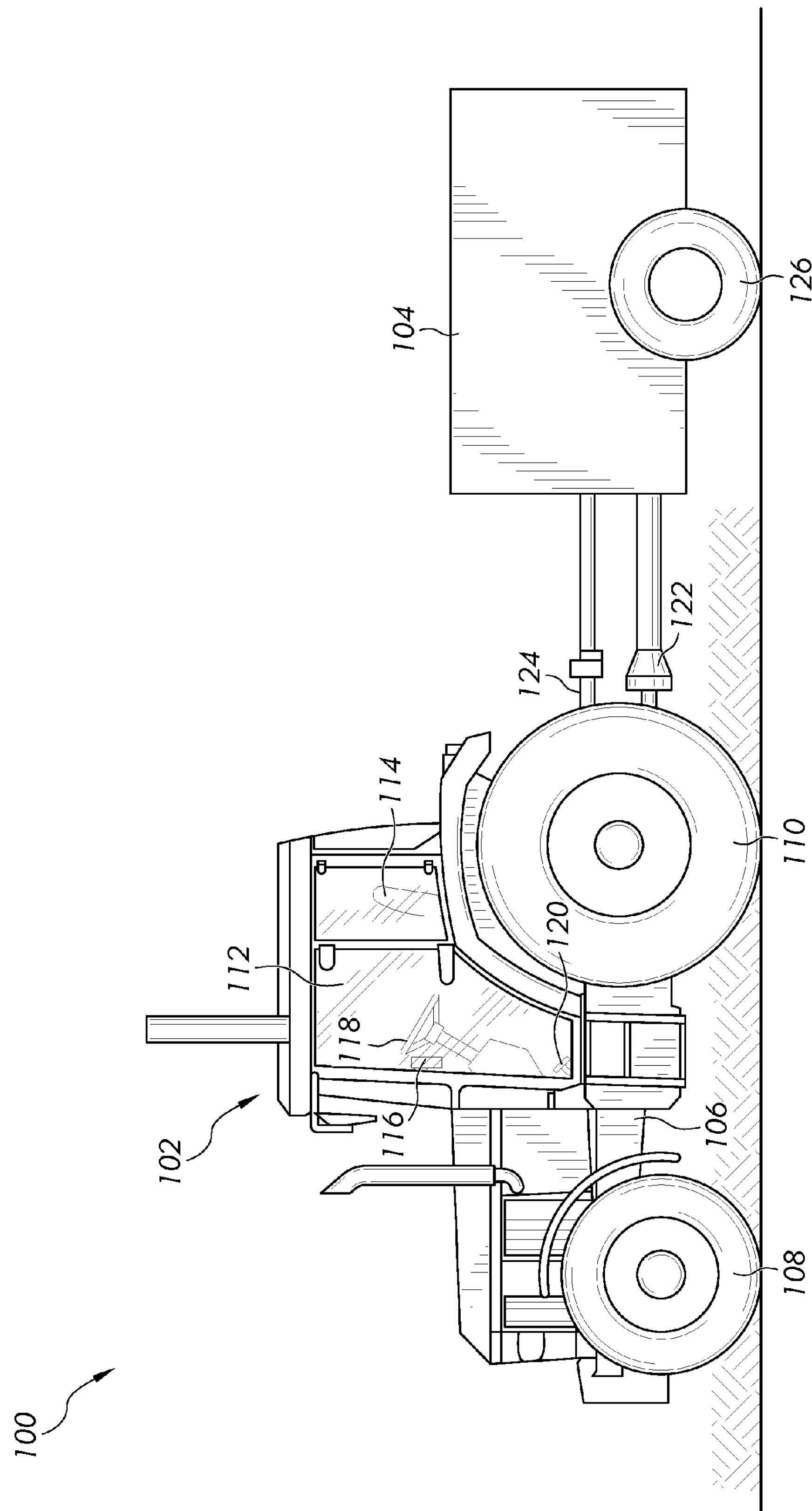
FIG. 1 is a side view of a combined tractor and trailer system.

Referring to FIG. 1, a combined tractor trailer system 100 is shown. In this system, a tractor 102 is shown coupled to and pulling a trailer 104. The tractor 102 may have a chassis 106 that spans between a front ground engaging mechanisms 108 and a rear ground engaging mechanisms 110. In the embodiment of FIG. 1, each ground-engaging mechanism is in the form of a wheel defined along a respective axle, i.e., a front axle and a rear axle. In other embodiments, however, the ground-engaging mechanism may be a track that propels the tractor 102 along a ground surface. Likewise, the trailer 104 may also include at least one ground-engaging mechanism such as a wheel 126.

A cab 112 may be coupled to the chassis 106 and define a location for an operator to be positioned in an operator's seat 114. From the cab, the operator may control the tractor 102 and trailer 104 via a plurality of controls. As shown, the cab 112 may include a display 116 or dashboard that visually shows control characteristics of the tractor 102 or trailer 104 such as speed, power, temperature, pressure, direction, and any other type of control characteristic. The display 116 may be a touchscreen display that includes one or more operator controls for selectively controlling the operation of the tractor 102 or trailer 104. Other controls may include a steering wheel or yoke 118, a pedal 120 (e.g., a brake pedal, clutch pedal, or throttle pedal), any other type of control such as a joystick, switch, lever, knob, etc. for controlling the tractor trailer system 100.

While a tractor 102 is shown and described herein, any type of work machine may utilize the teachings of this disclosure and therefore it is not intended to be limited to applying to only tractors. In other embodiments, a truck configured to tow a trailer may utilize the teachings of this disclosure. Accordingly, the tractor 102 can be any type of work machine used to pull a trailer.

The tractor 102 may be coupled to the trailer 104 through a hitch member or drawbar 122. The hitch member or drawbar 122 may be sufficiently strong to transfer motion of the tractor 102 to the trailer 104. In one embodiment, when the tractor 102 travels in a forward direction, the hitch member 122 pulls the trailer 104 along therewith in approximately the same direction.

One or more fluid lines 124 may also be provided. For purposes of this disclosure, a fluid may include a gas or liquid. Thus, any pneumatic or hydraulic line may be referred to as a fluid line herein. The one or more fluid lines 124 may selectively fluidly couple a tractor brake system to a trailer brake system. More specifically, the tractor 102 may provide a trailer brake output that is coupled to the trailer brake system. In this configuration, when the user initiates a brake command, both the tractor brake system and the trailer brake system may simultaneously engage to slow the tractor 102 and trailer 104.

In some tractor trailer systems, one or more brake pedals may be engaged by an operator to apply a tractor service brake. Brake actuators may be pressurized to apply the brakes, which will be described in greater detail below with reference to FIG. 2. Once the operator commands engagement of the tractor braking system, the trailer braking system also must engage to prevent the trailer from contacting or running into a back end of the tractor. In many conventional braking systems, there may be a single hydraulic line that connects between the tractor and trailer braking systems. In addition, a single hydraulic trailer brake valve may have a fixed gain associated with it due to its geometry. Thus, depending upon the fixed gain, an amount of pressure entering the valve if multiplied by the fixed gain to deliver a predetermined outlet pressure. As braking systems change and new federal and international guidelines or standards change, there is a need for both lower and higher outlet pressures depending upon the type of trailer. As a result, an adjustable gain across the hydraulic trailer brake valve is desirable over a fixed gain valve. Other needs and advantages will become apparent from the principles and teachings of the present disclosure.

Figure 2:
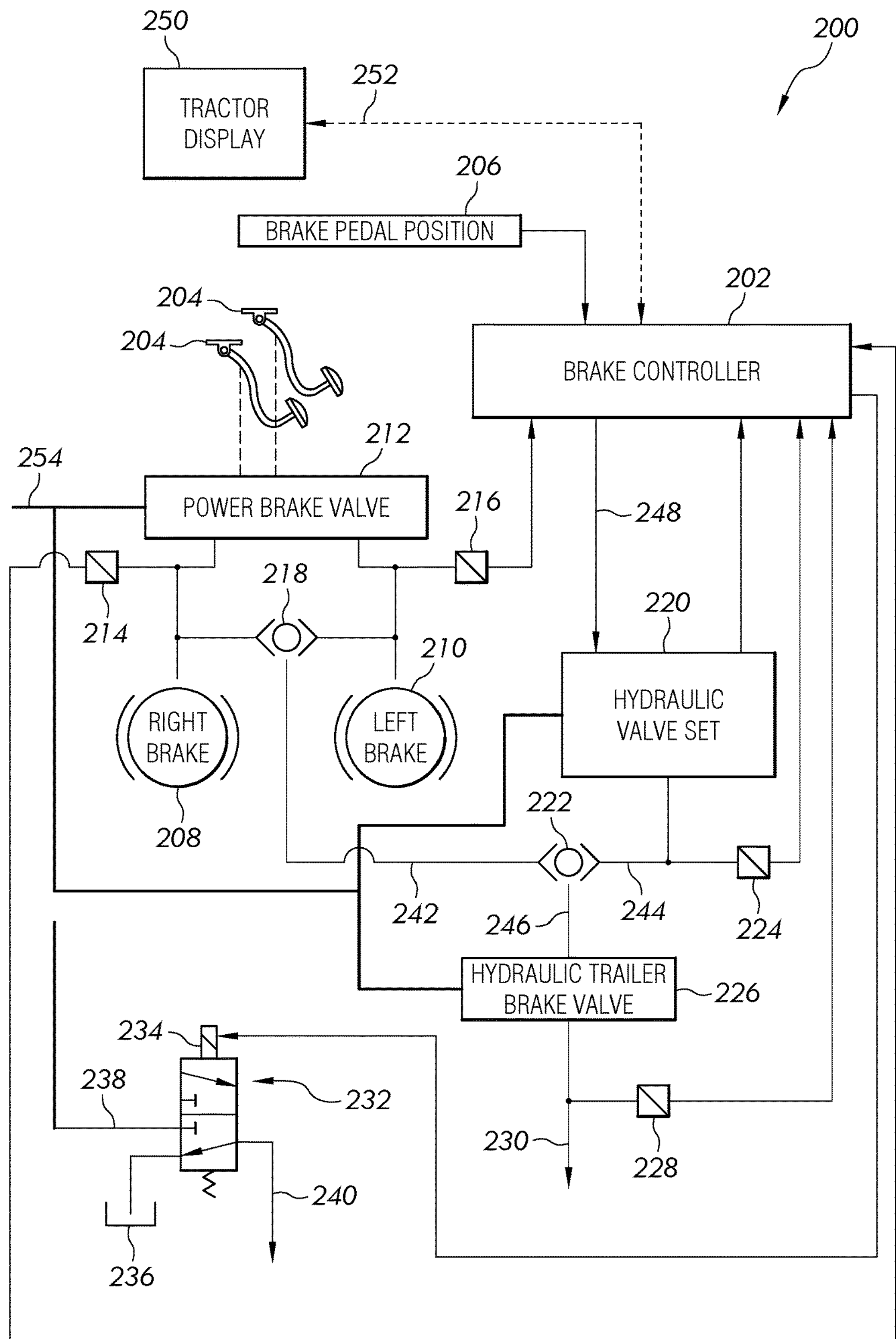
FIG. 2 is a control schematic view of a hydraulic system of a combined tractor and trailer brake system.

In some tractor trailer systems, the trailer braking system includes a hydraulic braking system, a pneumatic braking system, or a combination thereof. An example of a trailer brake system is shown in FIG. 2. In this embodiment, a hydraulic braking system 200 of a tractor and a trailer may include a brake controller 202 as shown. The brake controller 202 may be in electrical communication with a vehicle controller (not shown), an engine controller (not shown), a transmission controller (not shown), and any other type of controller for controlling the tractor or trailer. The brake controller 202 may include a plurality of inputs and outputs for receiving and communicating electrical signals or commands to different components within the braking system 200. In FIG. 2, for example, the brake controller 202 may be disposed in electrical communication with a tractor display 250. This communication may exist over a controller area network (CAN) bus 252 or communication link. The display 250 may allow an operator to selectively communicate instructions to the brake controller 202 for controlling the tractor braking system or the trailer braking system 200.

Other operator controls may also be in communication with the brake controller 202. For example, one or more brake pedals 204 may be selectively engaged by an operator. A brake position sensor 206 may detect a movement of the one or more brake pedals 204 and communicate this movement to the brake controller 202. Upon application of the one or more brake pedals 204, a brake valve 212 may be triggered such that fluid from a hydraulic supply line 254 (via a pump or other pressure source) is delivered to brake actuators. In turn, the brake actuators are controllably actuated to deliver hydraulic brake pressure to the tractor braking system to control the speed of the tractor. In FIG. 2, the braking system 200 illustrates a right brake actuator 208 and a left brake actuator 210. In this embodiment therefore the operator may depress a right brake pedal and a left brake pedal to engage the tractor braking system. The right brake pedal and right brake actuator 208 may control brake pressure to a service brake on the right, rear wheel of the tractor, and the left brake pedal and left brake actuator may control brake pressure to a service brake on the left, rear wheel of the tractor. In doing so, the right brake actuator 208 and left brake actuator 210 deliver hydraulic pressure to the tractor service brakes to slow the vehicle. This hydraulic pressure may also be delivered to the trailer braking system as will be described below.

As is known, an operator may apply the brake pedals to brake the tractor and slow its speed. In addition, an operator may gently apply or tap on the brake pedal, as is often the case with an operator desiring to disable cruise control in a motor vehicle. In the tractor trailer system, it may be desirable to begin braking the trailer as soon as the brake controller 202 detects engagement of the one or more brake pedals 204. In this example, the brake controller 202 may execute a pre-brake routine or algorithm to begin applying the trailer braking system. In the embodiment of FIG. 2, the brake pedal position sensor 206 can send a signal to the brake controller 202 indicating that the operator has begun to depress the pedals 204. Before any brake pressure or a substantial amount of brake pressure is generated, the brake controller 202 may execute the pre-brake routine and send a signal to the trailer braking system to begin braking the trailer. This signal may be an adjustable or proportional signal from the brake controller 202. The signal may be received by a trailer brake valve that includes a first solenoid valve and a second 2-way position valve (i.e., an on/off valve). In one example, up to seven bars of pressure may be output from the valve to the trailer brakes to begin a braking operation.

During this pre-brake routine, the first solenoid valve may receive the signal from the brake controller and deliver the hydraulic pressure to the trailer brakes. The second, 2-way position valve may be disposed in its open position to allow fluid pressure to pass through. However, if there is a failure detected in the system, the second, 2-way position valve can be actuated to its off or closed position to block fluid pressure to the trailer brake system. This "fail-silent" condition may be utilized to protect against possible failures in the system. In any event, hydraulic pressure may still pass through a main hydraulic trailer brake valve 226 (FIG. 2) so that the trailer braking system is engaged during a braking operation. The pre-brake valve set, however, may be disabled or closed so that no output pressure passes through the valve set to the trailer brakes.

In FIG. 2, hydraulic brake pressure from the right brake actuator 208 may be detected by a first pressure transducer 214, and from the left brake actuator 210 may be detected by a second pressure transducer 216. The first and second transducers may be in electrical communication with the brake controller 202. This electrical communication may be either wired or wireless communication, or any other known or to be developed form of communication. As a result, the brake controller 202 can monitor brake pressure from both actuators.

A shuttle valve 218 may be disposed in fluid communication with the right brake actuator 208 and the left brake actuator 210. The shuttle valve 218 may be actuated in either direction depending upon which brake pressure is the greatest. As such, the greater of the two brake pressures passes through the shuttle valve 218 and is referred to as brake pilot pressure. In FIG. 2, the brake pilot pressure flows downstream from the shuttle valve 218 along a brake pilot line 242.

The braking system 200 of FIG. 2 may also include a hydraulic valve set 220. This valve set 220 may be similar to the aforementioned pre-brake valve set in that it includes both a proportional solenoid valve and a 2-way shutoff valve. As shown, the brake controller 202 may be in electrical communication with the hydraulic valve set 220 to control its operation. For example, a trailer brake command 248 may be communicated from the brake controller 202 to the valve set 220. Moreover, the valve set 220 may send signals to the brake controller 202 in response to its operation (i.e., a pressure transducer 224 may communicate a pressure associated with the valve set to the controller 202).

Outlet pressure from the hydraulic valve set 220 may flow through a fluid line 244 as shown in FIG. 2. The hydraulic valve set fluid line 244 and the brake pilot line 242 may converge upon a second shuttle valve 222. Similar to the operation of the first shuttle valve 218, the greater of the brake pilot pressure and hydraulic valve set pressure may pass through the second shuttle valve 222 and enter hydraulic line 246. The pressure in hydraulic line 246 may be referred to as the hydraulic pilot pressure. A pressure transducer 228 can detect the hydraulic pilot pressure and communicate this pressure to the brake controller 202, as shown in FIG. 2. This hydraulic pilot pressure may pass through a hydraulic trailer brake control line 230 to the trailer brakes.

In the system 200 of FIG. 2, the trailer may also include a trailer park brake. The trailer park brake may be operably controlled via a hydraulic trailer park control valve 232. This valve 232 may include a solenoid 234 that is in electrical communication with the brake controller 202. The hydraulic trailer park control valve 232 may be biased to its vented position to allow pressure to flow through a supplementary hydraulic line 240. The valve 232 may also be in fluid communication with a tank or reservoir 236 as shown. As such, hydraulic pressure may be delivered from a supply line 238 to the hydraulic trailer park control valve 232, and in its normally or biased open position, pressure passes therethrough to the hydraulic trailer brake supplementary line 240.

Figure 3:
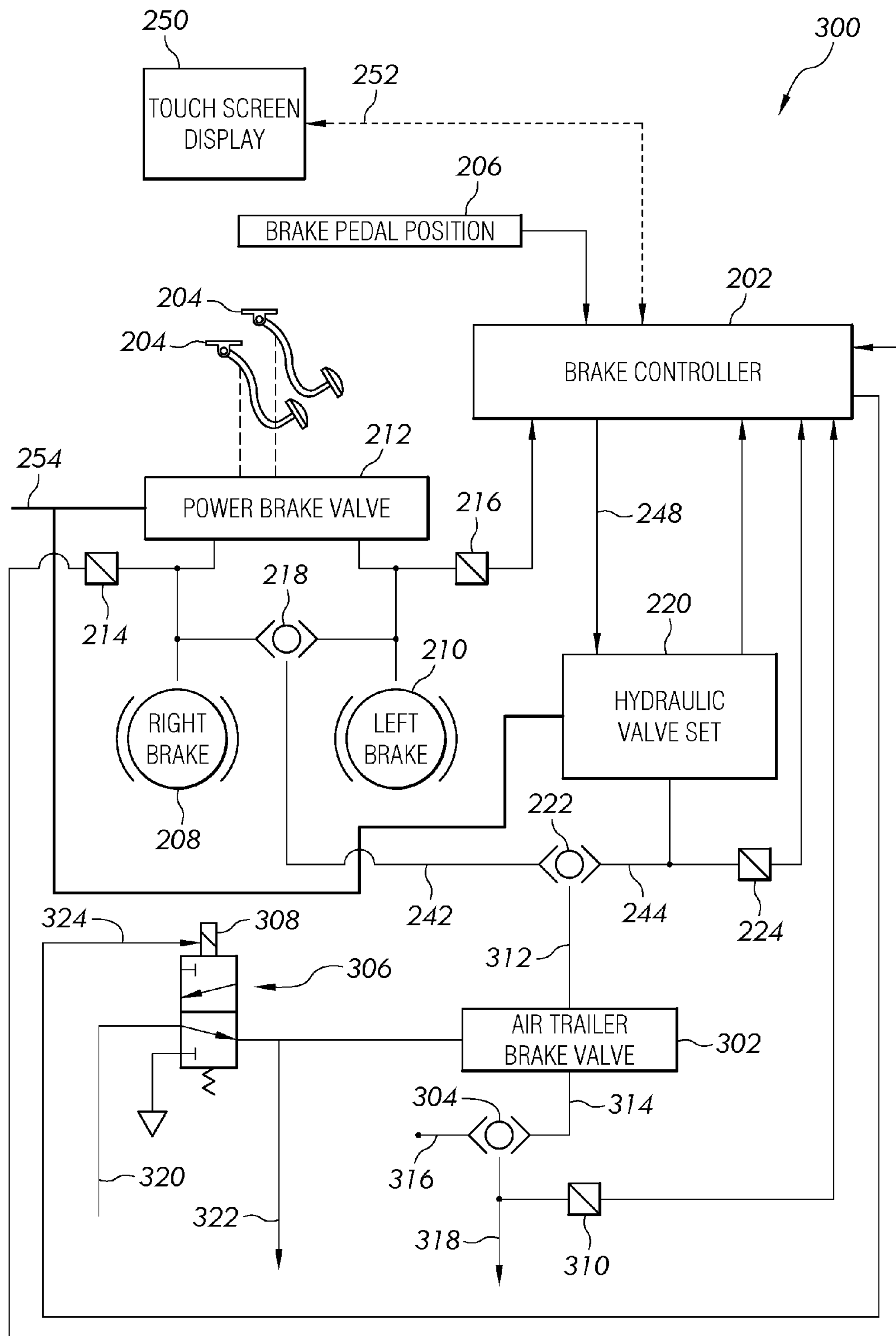
FIG. 3 is a control schematic view of a combined hydraulic and pneumatic system of a combined tractor and trailer brake system.

Referring to FIG. 3, a portion of the braking system 200 of FIG. 2 is removed and an air or pneumatic trailer braking system 300 is shown. As described above, the trailer braking system may be hydraulic, pneumatic, or a combination thereof. In this disclosure, the pneumatic trailer braking system may use any form of gas for controlling its brakes. However, for sake of simplicity, the type of gas will be referred to as air through the remainder of this disclosure. Thus, the pneumatic trailer braking system 300 will be referred to as the air trailer braking system 300, but it is to be understood that any type of gas may be used to control the trailer brakes.

In FIG. 3, the air trailer braking system 300 may include an air or pneumatic trail brake valve 302. The air trailer brake valve 302 may be located downstream from the second shuttle valve 222 of the hydraulic system 200 such that hydraulic pressure is used as an inlet to control the valve 302. Hydraulic pressure may flow through a pilot pressure line 312 to an inlet of the air trailer brake valve 302.

In addition to the air trailer brake valve 302, the air trailer braking system 300 may also include an air supply line 320, a shuttle valve 304, an air trailer park brake control valve (not shown), and a leak detect valve 306. The shuttle valve 304 is disposed downstream of the air trailer brake valve 302 and the air trailer park brake control valve. Thus, air pressure may be output from the air trailer brake valve 302 via a first pressure line 314 and from the air trailer park brake control valve via a second pressure line 316. The greater of the two pressures from the first and second line may trigger the shuttle valve 304 open so that air pressure can flow through a first air trailer brake control line 318 to the air trailer brakes. A pressure transducer 310 may be in fluid communication with the control line 318 to detect the pressure and communicate it to the brake controller 202.

The leak detect valve 306 may be in the form of a normally open solenoid control valve. The valve 306 may include a solenoid 308 that is disposed in electrical communication with the brake controller 202. As such, the brake controller 202 can control the leak detect valve 306 between its open and closed positions via a communication link 324 with the solenoid 308.

Air pressure may be supplied via the supply line 320 to the leak detect valve 306. Since the leak detect valve 306 may be biased to its open position, fluid may flow through the valve 306 to the air trailer brake valve 302 and to an air trailer brake supply line 322.

The embodiments of FIGS. 2 and 3 are illustrative of only one example of a braking system for a tractor trailer combination. Other embodiments of a braking system is possible and within the scope of this disclosure. For instance, another embodiment may include one or more electrohydraulic secondary brake valves.

Figure 4:
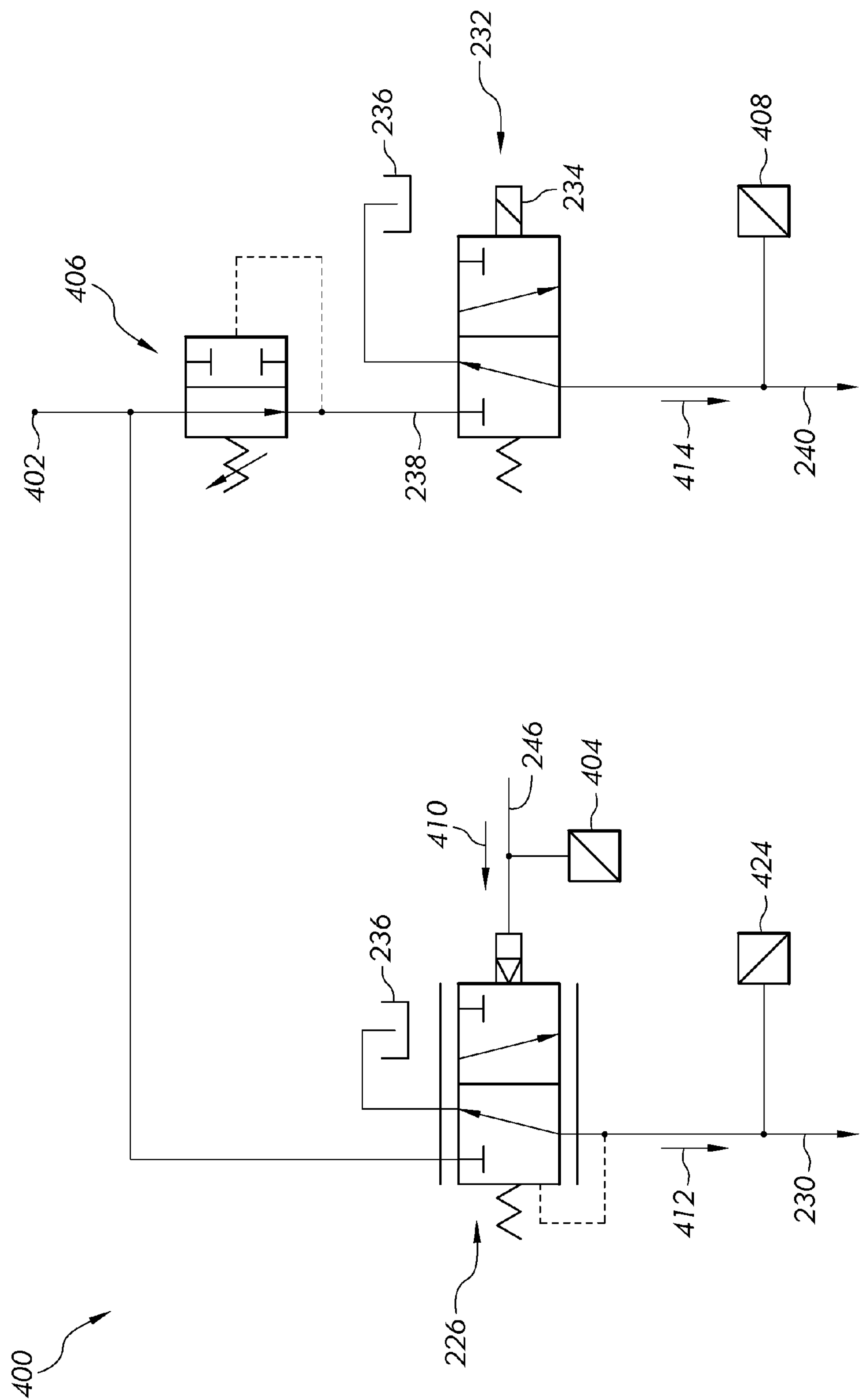
FIG. 4 is a schematic of a dual line trailer brake circuit.

Referring to FIG. 4, a trailer brake control system or circuit 400 is shown. As previously described, a conventional agriculture machine such as a tractor may include a single line hydraulic trailer brake circuit. The single line may provide pressure for applying service brakes on a trailer. Governmental regulations and various safety standards, particularly in Europe, have begun regulating trailer brake circuits and requiring at least two hydraulic lines for trailer braking. To meet governmental regulations and safety standards, a system such as the one illustrated in FIG. 4 is necessary and provides a primary and secondary hydraulic lines for applying trailer brakes. As will be described, the primary hydraulic line may control service brakes on the trailer, and the second line may control a park brake.

In FIG. 4, the control system 400 may include the hydraulic trailer brake valve 226 as described above and shown in FIG. 2. The hydraulic trailer brake valve 226 may be fluidly coupled to a supply 402 of pressurized hydraulic fluid. Moreover, and as described above, the hydraulic trailer brake valve 226 may include an let for receiving pilot pressure from service brakes on the work machine. The pilot pressure may be fluidly coupled to the hydraulic trailer brake valve 226 via line 246, through which the fluid flows in an inlet direction indicated by arrow 410.

The hydraulic trailer brake valve 226 may include a fixed gain that is predefined based on the geometry or design of the valve. In one non-limiting example, the gain may be defined as 3.0, such that outlet pressure may be approximately three times the pilot pressure. In other embodiments, the gain may be defined as any value based on the valve design. Thus, pilot pressure is output via the valve 226 through an outlet at a pressure that is a factor of the gain. Outlet pressure may flow in an outlet direction indicated by arrow 412 through the hydraulic trailer brake control line 230 (i.e., primary line) to the trailer brakes.

The control system 400 of FIG. 4 may also include the trailer park brake valve 232 as described above and shown in FIG. 2. The trailer park brake valve 232 may be fluidly coupled to the supply 402, and output pressurized hydraulic fluid via a secondary or supplementary line 240 in an outlet direction as shown by arrow 414 in FIG. 4. The trailer park brake valve 232 may be in the form of a solenoid control valve that includes a solenoid 234 electrically coupled to the brake controller 202. As such, the controller 202 may control the valve 232 between an energized state and a de-energized state. Moreover, the trailer park brake valve 232 and supplementary line 240 are disposed in parallel to the primary hydraulic line 230 shown in FIG. 4. The secondary or supplemental line 240 may control fluid pressure for engaging or disengaging a trailer park brake. This will be described in further detail below. Fluid pressure in the supplemental line 240 may be detected or measured by a pressure sensor 408 that is in fluid communication therewith. The pressure sensor 408 is optional, but in those embodiments in which it is present, the sensor 408 may be in electrical communication with the brake controller 202 to provide feedback of the supplemental line pressure to the controller 202.

The control system 400 may further include a pressure-reducing valve 406 as shown in FIG. 4. The pressure-reducing valve 406 may be located between the supply 402 and the trailer park brake valve 232. In one non-limiting example, a pump or other fluid supply 402 may provide between 30-200 bar of pressure. The trailer park brake valve 232 may be ill-equipped to handle such high pressures, and thus the pressure-reducing valve 406 is designed to reduce the pressure before it flows to the trailer park brake valve 232. In one example, the reducing valve 406 may reduce the pressure to less than 50 bar. In another example, the pressure may be reduced to less than 40 bar. In a further example, the pressure may be reduced to between 15-35 bar. In any event, the pressure-reducing valve 406 may be designed to reduce the pressurized fluid from the supply 402 to a pressure that the trailer park brake valve 232 can handle.

The hydraulic park brake valve 232 may include a spring that biases the valve to block fluid flow therethrough. Pressurized fluid, however, from the supply 402 urges the valve open to counteract against the spring resistance. When pressure is present in the supplemental line 240, the trailer park brake valve 232 is disposed in its open position to allow fluid to flow therethrough. To open the valve 232, the controller 202 may energize the solenoid 234. If it is desired to close the valve and vent the pressure, and thus apply the park brake, the controller 202 may de-energize the solenoid 234. Thus, when the trailer is in park, the supplemental line pressure may be vented to tank 236, and when the trailer is not in park the supplemental line pressure may be set by the amount of reduced pressure outlet via the reducing valve 406.

Although not shown, the trailer may be equipped with a park brake. The park brake may be a spring-biased such that when there is no pressure in the supplemental line, the spring biases the brake to its engaged position. When there is pressure in the supplemental line, however, the pressure counteracts the spring and disengages the park brake.

The dual line hydraulic brake circuit 400 of FIG. 4 is designed for leak detection and also to take the necessary precautions if a leak is detected. A control process 500, shown in FIG. 5, may be provided to detect a leak and control the circuit when a leak is detected. The control process 500 may include a plurality of blocks or steps that may be executed in order to detect the leak and take corrective action. In one embodiment, the control process 500 may be executed by a processor of the brake controller 202, and an algorithm or software stored in a memory unit of the controller 202 may provide the necessary instructions for executing the process 500.

In this process 500, a first block 502 may be executed by supplying pressurized fluid from the supply 402 to the hydraulic trailer brake valve 226 and the trailer park brake valve 232. The hydraulic trailer brake valve 226 may also receive pilot pressure via line 246 in block 504. The pilot pressure may be in response to actuation of service brakes on the work machine or tractor.

In block 506 of the process 500, the supply of pressurized fluid may be approximately 30-200 bar. As such, the pressure-reducing valve 406 can reduce the pressure of the pressurized fluid to the trailer park brake valve 232. As described above, the pressure may be reduced to less than 50 bar. In one non-limiting example, the pressure may be reduced to between 15-35 bar. In a further non-limiting example, the pressure may be reduced to approximately 20 bar. The pressure reduction may depend upon the size and capability of the trailer park brake valve 232.

As pressurized fluid is supplied to the trailer park brake valve in blocks 502 and 506, the brake controller 202 may control the trailer park brake valve 232 between its energized state and de-energized state. In block 508, the controller 202 may send current to the solenoid 234 to energize the valve 232. In doing so, the trailer park brake valve 232 may output hydraulic fluid to a supplemental line in block 510. With fluid pressure in the supplemental line, the park brake is biased or moved to its disengaged position.

During a normal braking operation, pilot pressure is supplied to an inlet of the hydraulic trailer brake valve 226, and based on a fixed gain of the valve, hydraulic pressure is output via the valve 226 to a primary line 230 in block 514 which fluidly couples to service brakes on the trailer. During operation, block 516 may be executed as a first pressure sensor 404 detects or monitors pilot pressure, and a second pressure sensor 228 detects or monitors output pressure. Each sensor may be in electrical communication with the brake controller 202. Thus, the brake controller 202 may continuously monitor the inlet and output pressures of the hydraulic trailer brake valve 226.

In addition, the brake controller 202 may be pre-programmed such that it stores the fixed gain of the hydraulic trailer brake valve 226. In doing so, the controller 202 may execute block 518 by comparing the pilot pressure to the output pressure as a function of the valve gain. Here, the controller 202 can multiply the pilot pressure by the gain, and then subtract the output pressure to determine the difference. In block 520, the controller 202 may compare the difference to a threshold pressure. The threshold pressure may be a fixed value stored in the memory unit of the controller 202. If the difference exceeds the threshold, then the controller 202 may determine that there is a leak in the primary line 230. If the difference does not exceed or satisfy the threshold, then the controller 202 may determine there is no leak.

If the controller 202 determines there is a leak in block 520, the controller 202 may then execute block 522 by de-energizing the solenoid 234 of the trailer park brake valve 232. When the trailer park brake valve 232 is de-energized, its spring biases the valve to a closed position to block hydraulic fluid from flowing therethrough and into the supplemental line 240. In other words, hydraulic flow is cut off from the supplemental line 240 by the trailer park brake valve 232. As fluid is cut off from the supplemental line 240, there is no pressure to hold the park brake in its disengaged position. As such, block 524 may be executed when a leak is detected by applying the park brake. This puts the trailer in a safe state by braking the trailer via the park brake when the leak is detected. The brake controller 202 may also send a warning or instruction to the dashboard or operator screen 116 in the tractor to alert the operator of the detected leak.

Figure 5:
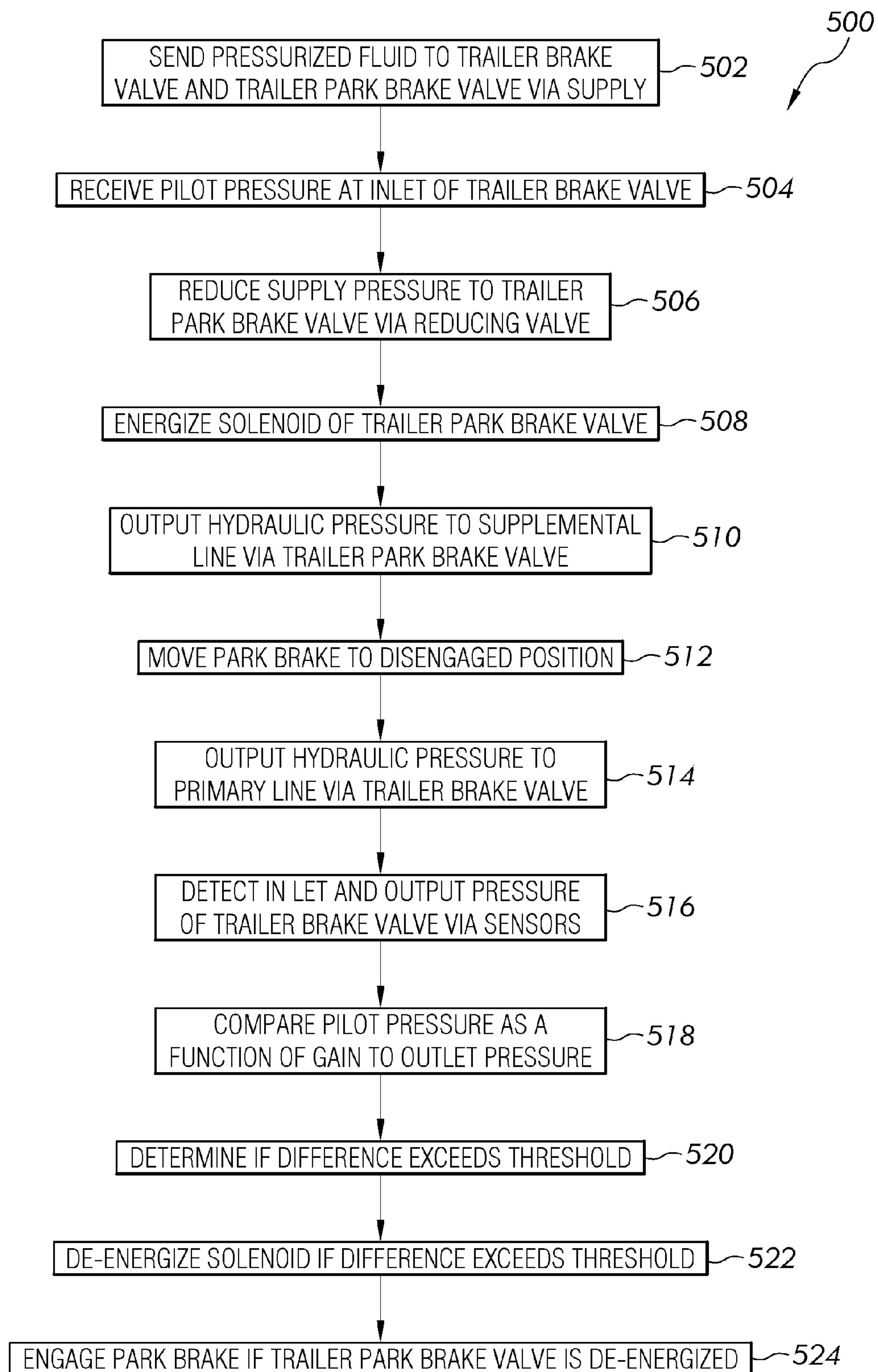
FIG. 5 is a flow diagram of a control process for controlling the dual line trailer brake circuit of FIG. 4.

The control process 500 of FIG. 5 may be executed continuously. However, leak detection is only executed when there is pilot pressure provided to the air trailer brake valve 302. In other words, only as the operator is applying the service brakes on the work machine is the leak detection process 500 executed.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic braking system of a trailer, comprising:
- a pressurized supply of hydraulic fluid;
- a base valve including an inlet and an outlet;
- a control valve including a solenoid, an inlet fluidly coupled to the pressurized supply of hydraulic fluid, and an outlet, the control valve operably controlled between an energized state and a de-energized state;
- a first brake output fluidly coupled to the outlet of the base valve;
- a second brake output fluidly coupled to the outlet of the control valve;
- a first sensor and a second sensor fluidly coupled to the base valve, the first sensor configured to detect a first pressure at the inlet of the base valve along an inlet line separate from the first brake output, and the second sensor configured to detect a second pressure at the outlet of the base valve;
- wherein, the control valve is operably controlled to its de-energized state when a difference between the first pressure and second pressure satisfies a threshold.

2. The braking system of claim 1, wherein in the de-energized state the pressurized supply is fluidly coupled to the second brake output, and in the energized state the control valve fluidly de-couples the pressurized supply from the second brake output.

3. The braking system of claim 1, further comprising:
- a controller disposed in electrical communication with the first and second sensors,
- wherein the base valve comprises a fixed gain and the controller compares the first pressure as a function of the fixed gain to the second pressure to determine the difference and whether to operably control the control valve to its energized state or de-energized state.

4. The hydraulic braking system of claim 3, wherein the fixed gain comprises a gain of 3.0.

5. The braking system of claim 1, further comprising a reduction valve fluidly coupled between the pressurized supply and the control valve, wherein the reduction valve is configured to reduce an amount of fluid pressure supplied by the pressurized supply to the control valve.

6. The hydraulic braking system of claim 5, wherein the reduction valve is configured to reduce the fluid pressure supplied by the pressurized supply to the control valve to less than 50 bar.

7. The hydraulic braking system of claim 6, wherein the reduction valve is configured to reduce the fluid pressure supplied by the pressurized supply to the control valve to less than 40 bar.

8. The hydraulic braking system of claim 7, wherein the reduction valve is configured to reduce the fluid pressure supplied by the pressurized supply to the control valve to between 15-35 bar.

9. The braking system of claim 1, further comprising a park brake hydraulically controlled by the second brake output between a disengaged position and an engaged position, wherein in the de-energized state the park brake is in its disengaged position, and in the energized state the park brake is in its engaged position.

10. The hydraulic braking system of claim 1, further comprising a third sensor fluidly coupled to the control valve, the third sensor configured to detect an output pressure in the second brake output.

11. The hydraulic braking system of claim 1, wherein the control valve is operably controlled to its de-energized state when a difference between the first pressure and the second pressure exceeds the threshold.

12. A hydraulic braking system of a trailer towed by a work machine, comprising:

a controller;

a pressurized supply providing hydraulic fluid;

a pilot line providing a pilot pressure;

a base valve including a first inlet, a second inlet, and an outlet, where the first inlet is fluidly coupled to the pilot line and the second inlet is fluidly coupled to the pressurized supply;

a solenoid control valve disposed in electrical communication with the controller and including an inlet fluidly coupled to the pressurized supply of hydraulic fluid and an outlet, the solenoid control valve operably controlled between an energized state and a de-energized state by the controller;

a reduction valve fluidly coupled between the pressurized supply and the solenoid control valve, wherein the reduction valve is configured to reduce an amount of fluid pressure supplied by the pressurized supply to the solenoid control valve;

a first control line fluidly coupled to the outlet of the base valve;

a second control line fluidly coupled to the outlet of the solenoid control valve;

a first sensor and a second sensor fluidly coupled to the base valve, the first sensor configured to detect pilot pressure, and the second sensor configured to detect an output pressure in the first control line; and a third sensor fluidly coupled to the solenoid control valve, the third sensor configured to detect an output pressure in the second control line, wherein, the solenoid control valve is operably controlled to its energized state when a difference between the pilot pressure and output pressure satisfies a threshold.

13. The hydraulic braking system of claim 12, wherein:

in the energized state the pressurized supply is fluidly coupled to the second control line, and in the de-energized state the solenoid control valve fluidly decouples the pressurized supply from the second control line.

14. The hydraulic braking system of claim 12, further comprising a park brake hydraulically controlled by the solenoid control valve between a disengaged position and an engaged position, wherein in the energized state the park brake is in its disengaged position, and in the de-energized state the park brake is in its engaged position.

15. The hydraulic braking system of claim 12, wherein the solenoid control valve is operably controlled to its de-energized state when the difference between the pilot pressure and the output pressure exceeds the threshold.

16. The hydraulic braking system of claim 12, wherein the base valve comprises a fixed gain of 3.0 and the controller compares the pilot pressure as a function of the fixed gain to the output pressure to determine the difference and whether to operably control the control valve to its energized state or de-energized state.

17. The hydraulic braking system of claim 12, wherein the reduction valve is configured to reduce the fluid pressure supplied by the pressurized supply to the solenoid control valve to less than 50 bar.

18. The hydraulic braking system of claim 17, wherein the reduction valve is configured to reduce the fluid pressure supplied by the pressurized supply to the solenoid control valve to less than 40 bar.

19. The hydraulic braking system of claim 18, wherein the reduction valve is configured to reduce the fluid pressure supplied by the pressurized supply to the solenoid control valve to between 15-35 bar.

* * * * *